United States Patent
Reitnour et al.

(10) Patent No.: US 8,768,294 B2
(45) Date of Patent: *Jul. 1, 2014

(54) NOTIFICATION AND TRACKING SYSTEM FOR MOBILE DEVICES

(75) Inventors: Philip A. Reitnour, Malvern, PA (US); Benjamin F. Reitnour, Malvern, PA (US); Nicholas R. Reitnour, Malvern, PA (US); John T. Reitnour, Malvern, PA (US)

(73) Assignee: Emergensee, LLC, Malvern, PA (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/604,372

(22) Filed: Sep. 5, 2012

(65) Prior Publication Data

US 2013/0040600 A1 Feb. 14, 2013

Related U.S. Application Data

(63) Continuation-in-part of application No. 13/004,705, filed on Jan. 11, 2011.

(60) Provisional application No. 61/350,762, filed on Jun. 25, 2010.

(51) Int. Cl.
*H04M 11/04* (2006.01)

(52) U.S. Cl.
USPC .......... 455/404.2; 455/404.1; 455/456.1; 455/457; 455/456.2; 455/456.4; 455/456.6

(58) Field of Classification Search
USPC .......... 455/404.1, 404.2, 456.1–457, 550.1, 455/556.1, 556.2, 557, 563–569.2, 574; 340/539.13, 988–996
See application file for complete search history.

(56) References Cited

U.S. PATENT DOCUMENTS

| | | | |
|---|---|---|---|
| 6,340,928 B1 | 1/2002 | McCurdy | |
| 6,509,830 B1 * | 1/2003 | Elliott | 340/286.02 |
| 7,224,956 B1 * | 5/2007 | O'Neil | 455/404.1 |
| 7,251,470 B2 | 7/2007 | Faucher et al. | |

(Continued)

FOREIGN PATENT DOCUMENTS

| | | |
|---|---|---|
| JP | 2001-250183 | 9/2001 |
| JP | 4403640 | 11/2009 |
| KR | 10-2005-0103349 | 10/2005 |
| KR | 10-0832124 | 5/2008 |

OTHER PUBLICATIONS

Ripcord Personal Security; App Store, Lifestyle, AquilaCom, 1 page, Jul. 29, 2010.

(Continued)

*Primary Examiner* — Ronald Eisner
(74) *Attorney, Agent, or Firm* — Baker & Hostetler LLP

(57) ABSTRACT

An notification and tracking system for a mobile device. The system includes a mobile device application that is adapted to be stored in memory on the mobile device. The application, upon activation, determines the GPS coordinates of the mobile device, records digital images over a period of time, sends a preset message from the mobile device to at least one recipient, preferably an emergency responder, such as a security monitoring station, and sends the GPS coordinates and the digital images. The coordinates and images may be sent to a remote server for storage and which can be accessed by the emergency responder. The coordinates and images are periodically updated and sent while the program is activated.

20 Claims, 4 Drawing Sheets

(56) References Cited

U.S. PATENT DOCUMENTS

| | | | | |
|---|---|---|---|---|
| 7,289,786 | B2 | 10/2007 | Krasner | |
| 7,349,705 | B1* | 3/2008 | Holland | 455/456.1 |
| 7,574,195 | B2 | 8/2009 | Krasner et al. | |
| 8,045,532 | B2* | 10/2011 | Thomson et al. | 370/338 |
| 8,045,954 | B2* | 10/2011 | Barbeau et al. | 455/404.1 |
| 8,264,345 | B2* | 9/2012 | Baron et al. | 340/539.3 |
| 2004/0152441 | A1* | 8/2004 | Wong | 455/404.1 |
| 2004/0203622 | A1* | 10/2004 | Esque et al. | 455/412.1 |
| 2005/0064887 | A1* | 3/2005 | Bengtsson et al. | 455/466 |
| 2006/0033615 | A1 | 2/2006 | Nou | |
| 2006/0068753 | A1* | 3/2006 | Karpen et al. | 455/404.2 |
| 2007/0087726 | A1* | 4/2007 | McGary et al. | 455/404.1 |
| 2007/0136678 | A1* | 6/2007 | Brown et al. | 715/771 |
| 2008/0188198 | A1* | 8/2008 | Patel et al. | 455/404.2 |
| 2008/0227429 | A1* | 9/2008 | Hodgson et al. | 455/404.2 |
| 2009/0037989 | A1* | 2/2009 | Ruggiero et al. | 726/6 |
| 2009/0100144 | A1* | 4/2009 | Sullivan et al. | 709/217 |
| 2009/0197567 | A1 | 8/2009 | Ogram | |
| 2009/0286504 | A1 | 11/2009 | Krasner et al. | |
| 2010/0003945 | A1* | 1/2010 | Primo et al. | 455/404.1 |
| 2010/0003954 | A1* | 1/2010 | Greene et al. | 455/404.1 |
| 2010/0003958 | A1* | 1/2010 | Ray et al. | 455/404.2 |
| 2010/0046721 | A1* | 2/2010 | Geldenbott et al. | 379/45 |
| 2011/0151829 | A1* | 6/2011 | Velusamy et al. | 455/404.2 |

OTHER PUBLICATIONS

Mobile Personal Security System; App Store, Lifestyle, Wizag LLC, 1 page, Mar. 11, 2010.

RU OK; App Store, Lifestyle, RU OK Personal Security, 1 page, Aug. 30, 2010.

EMailUrgency; App Store, Healthcare & Fitness, UbikiWare; 1 page Dec. 18, 2009.

Emergency Alarm; App Store, Utilities, Gadget Factory, 1 page, Dec. 17, 2009.

Emergency Distress Beacon; App Store, Navigation, Cinn Dev, 1 page, Aug. 25, 2008.

Emergency Location; App Store, Medical, Mark Locker, 1 page, Mar. 8, 2010.

ICodeRed SOS Emergency; App Store, Healthcare & Fitness, BAK2u Pte Ltd., 1 page, Nov. 27, 2008.

iHelp; App Store, Utilities, Echo (Arts), 1 page, May 30, 2009.

I'm Being Assaulted; App Store, Utilities, Adam Eisenman, 1 page, Feb. 24, 2010.

LifeButton; App Store, Navigation, antilia.biz,, 2 pages, Nov. 11, 2009.

Panic Button Emergency Locator; App Store, Utilities, Saritasa, 1 page, Dec. 23, 2009.

Silent Bodyguard—Your Personal Panic Button; App Store, Utilities, Fun at Work, 2 pages, May 10, 2010.

MyLocation—I am here; App Store, Navigation, MacMedia,1 page, Oct. 12, 2010.

i am Safe; Global Personal Security—24/7; http://iamsafe-mobile.com, 1 page, at least Dec. 2009.

JTrek, Personal Security Surveillance with Smartphones, Walk the Safest Mobile Application Safe! 3 pages, JTrek LLC, at least Dec. 2010.

JTrek—Deter Crime, Personal Security Surveillance for Smartphones, http://www.jtrek.com, p. 1, at least Dec. 2010.

JTrek—Features and Benefits—24/7 Surveillance Protection Device, http://www.jtrek.com/featuresBenefitsPage.php, 1 page, at least Dec. 2010.

JTrek—Product Overview—Using Smartphone Video/Cameral Technology as a Personal S, http://www.jtrek.com/products.php, 1 page, at least Dec. 2010.

JTrek—Five Powerful Reasons Why You Must Own JTrek, http://www.jtrek.com/fiveReasonsPage. php, 1 page, at least Dec. 2010.

JTrek—Safety on Campus, http://www.jtrek.com/safetyOnCampusPage.php, 1 page, at least Dec. 2010.

International Search Report and Written Opinion, 8 pages, dated Jan. 5, 2012.

\* cited by examiner

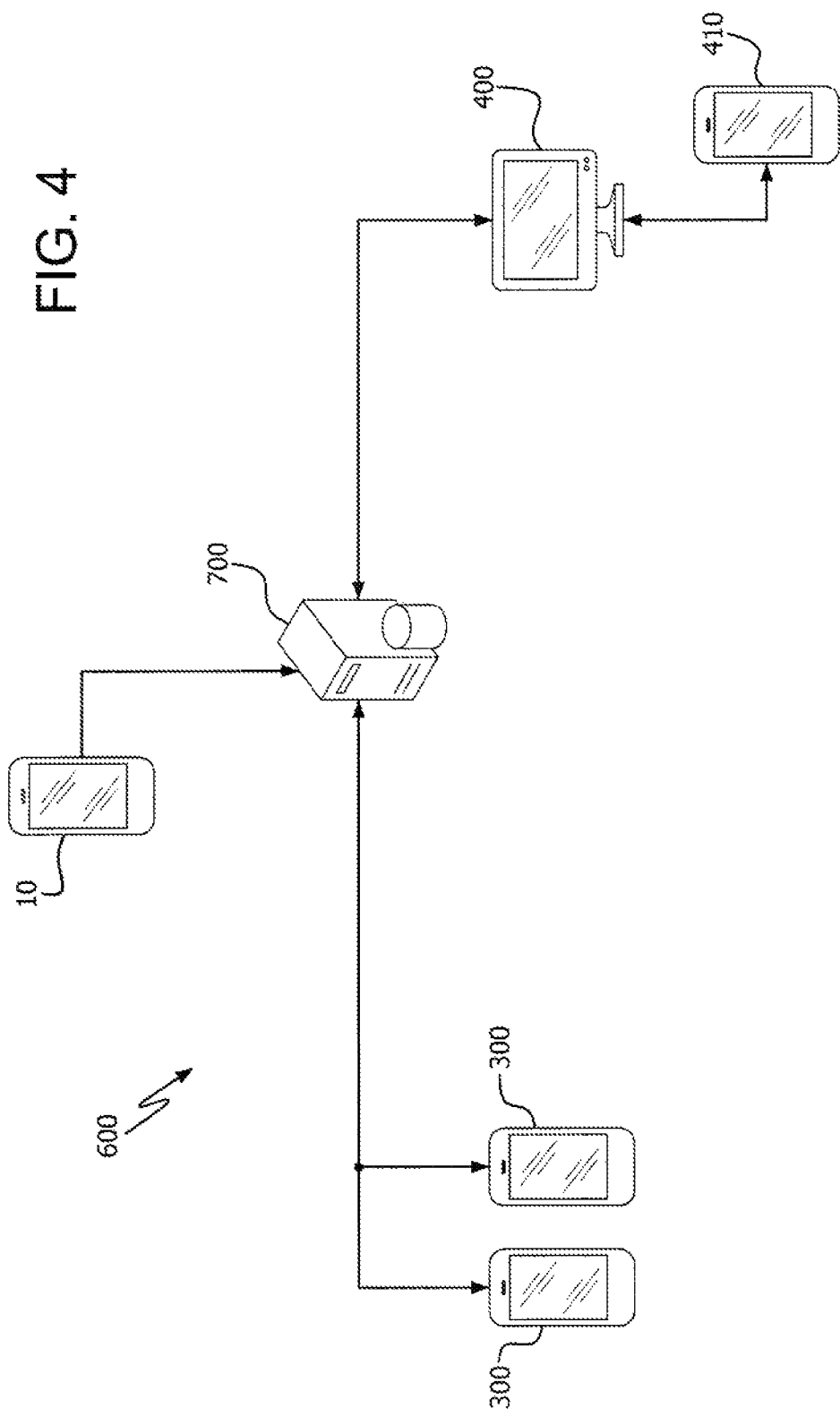

NOTIFICATION AND TRACKING SYSTEM FOR MOBILE DEVICES

RELATED APPLICATION

This application is related to and continuation-in-part of U.S. patent application Ser. No. 13/004,705, filed Jan. 11, 2011, which claims priority to U.S. Provisional Application 61/350,762, filed Jun. 25, 2010, the disclosures of which are both incorporated herein by reference in their entirety.

FIELD OF THE INVENTION

The present invention relates to a program for providing notification and/or capturing and transmitting pertinent information from a mobile device for tracking and monitoring of a mobile device.

BACKGROUND

A person's safety is almost always one of their top priorities. Unfortunately, when a person is kidnapped or robbed, the details related to the incident and the activities that occur immediately afterward, including the location, time, sounds, and events, are generally the most important, but hardest to determine.

There have been studies that show that the first few hours after a kidnapping are the most critical since the individuals involved are generally still in the area. As the crime "ages", it radius of interest increases and some of the critical evidence becomes lost.

Currently many individuals carry smart phones, PDAs and similar mobile devices that are capable of transmitting information. The inventor has developed a system that utilizes a mobile device to assist in capturing and transmitting critical information from the victim to persons who can provide the best chances of help.

There have been applications for providing emergency information that have been developed for use with wireless devices, such as the system described in US Patent Publication No. 2009/0286504, which is incorporated herein by reference in its entirety. However the present invention provides distinct advantages over such prior systems.

SUMMARY OF THE INVENTION

The present invention is directed to a notification and tracking/monitoring system for a mobile device. The system preferably includes an application operable on the mobile device which, upon activation, such as an emergency situation, causes the system to determine a set of global position system (GPS) coordinates associated with the location of a mobile device. A camera on the mobile device is activated to record digital images over a period of time. The digital images may comprise a video stream or still pictures. The set of GPS coordinates and the digital images are sent from the mobile device, preferably to a storage device, such as a remote sever. The application may also activate a microphone on the mobile device to record audio sounds from the mobile device. The audio data may be sent with the digital images.

A preset message is sent to one or more recipients indicating that the user of the mobile device is involved in an emergency situation. The recipients may include emergency responders, such as police, a monitoring service, and/or a list of emergency contacts previously entered by the user.

After a predetermined period of time, the mobile device captures another set of GPS coordinates associated with the updated location of the mobile device and records additional digital images over a period of time. The updated set of GPS coordinates and the additional digital images are sent from the mobile device, again preferably to the server. A heading and speed of the mobile device is calculated based on the sets of GPS coordinates.

If the GPS coordinates are sent to a remote server, the system preferably permits at least one remote recipient to retrieve the data stored there, including the calculated heading and speed of the mobile device, audio, video and images. This may be accomplished by including an internet link to the server in the notification message and directing the user to the server to obtain the data. Alternately, the heading and speed can be automatically sent from the server to the recipient.

The system continuously updates the GPS coordinates, images, sounds and heading until the application is deactivated.

It is contemplated that the images and coordinates may be sent with the preset message to the mobile recipients.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention that is presently preferred. However, it should be understood that this invention is not limited to the precise arrangements and instrumentalities shown in the drawings.

FIG. 4 schematically depicts an alternate system according to the present invention for transmitting emergency communications using the App.

DETAILED DESCRIPTION OF EMBODIMENTS

Figure 1:
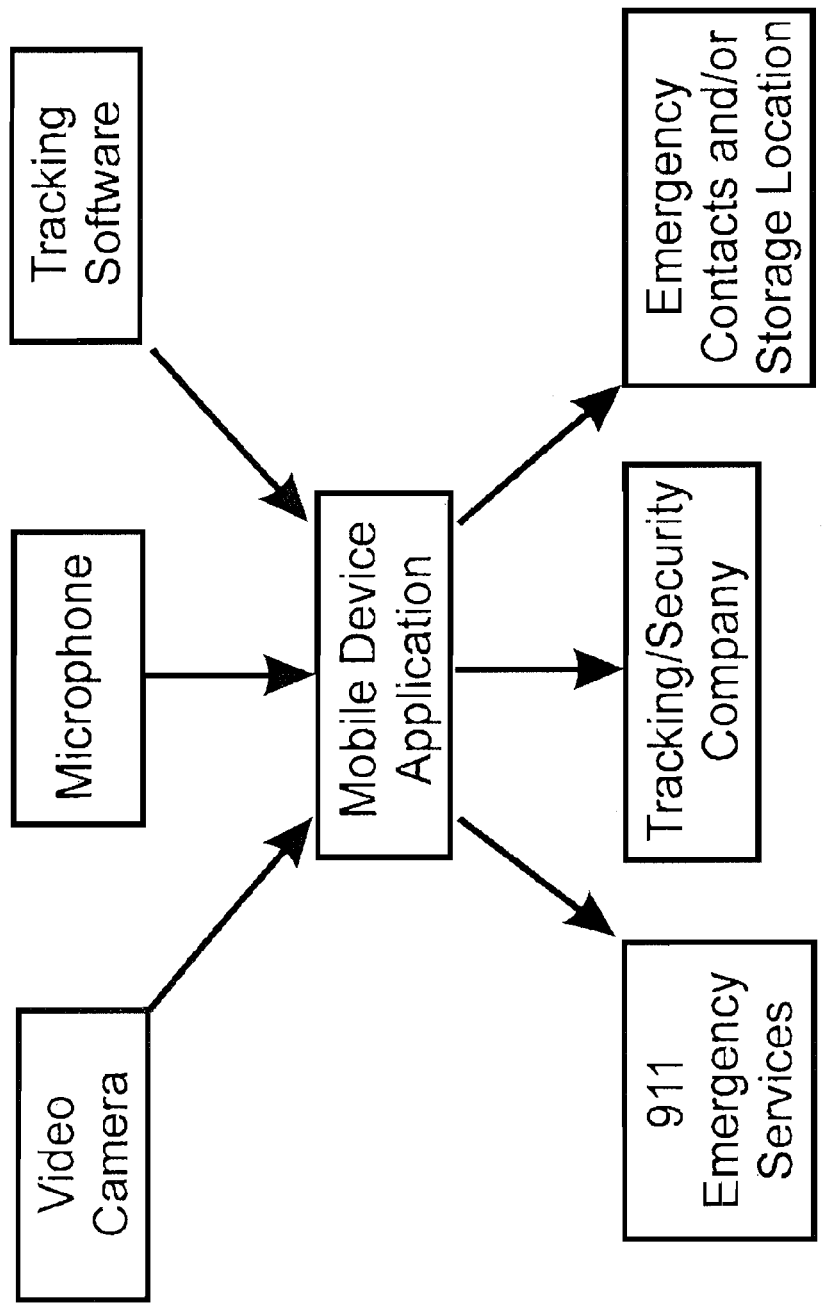
FIG. 1 schematically depicts one embodiment of the present invention.

Referring to FIG. 1, a general depiction of one embodiment of the present invention is shown. The invention is directed to an application or App 10 for a mobile wireless device 12, such as a cell phone, smartphone, laptop, netbook or other transportable device capable of transmitting information, including, for example, an Apple® iPhone® smartphone or iPad® tablet a Blackberry® or Android® smartphone, etc. It is also contemplated that the App may be part of a system that includes software located remotely from the mobile device and that interacts with the App for providing some of the functions described herein. In one operative configuration, the App 10 is stored and operates on the mobile device. The App may be stored in fixed or removable memory in the mobile device, such as a flashcard, memory stick or in resident memory, EPROM, RAM, ROM or other form of internal memory. While the App is described as a separate operating program, it is also contemplated that the software code could be incorporated into a larger software system, including the mobile devices' operating system.

The App may be loaded onto the device either through a wired or wireless connection, such as via a download from a remote storage location, like a server hosting a site with multiple applications, e.g., the Apple® App Store, that are downloaded by users. The App may alternatively be preinstalled in the mobile device or stored on a medium (CD ROM) for loading through a desktop system (e.g., PC or Mac® computer).

The App comprises program code to provide select emergency and/or notification functions when activated as described below.

The wireless mobile device 12 preferably includes a video or still camera 14, a microphone 16, a keyboard (either physical or electronically displayed on a touch screen), a position location system 18, such as a GPS receiver, that uses the wireless device's antenna to receive signals from a multiplicity of GPS satellites and process its position therefrom. The GPS satellites comprise any group of satellites that transmit GPS downlinks used for positioning by a GPS receiver. Each satellite has a computer and a clock and radio on board, and continually broadcasts its changing position and time. The GPS receiver is housed within or is coupled to the wireless mobile device and trilaterates its own position by processing the signals from downlinks from three or more satellites, resulting in a longitude and latitude position that can be very accurate. In some GPS receivers, timing information that is derived from the processing of the received GPS signals from downlinks is provided over a cellular (or other wireless link) to a remote entity which in turn computes the position of the GPS receiver. Such systems are sometimes called Assisted GPS receivers (AGPS). The position location system described could include either conventional and/or AGPS receivers, as well as other position location devices and methods. In the present invention it is contemplated that the video, microphone, and GPS components are conventional in the art and, thus no further discussion is necessary.

The wireless device 10 includes a wireless telecommunication system that is designed to transmit and receive voice and data between the wireless device 10 and one or more recipient devices through wireless communication receivers, such as cellular base stations, WIFI hubs, cell towers, satellite systems, etc. Any conventional telecommunication system can be used in the invention for communicating data and/or voice data. Although the present invention will be described primarily as providing one-way telecommunication, the invention is not limited to that and can be used with any conventional two-way communication system.

The App includes suitable hardware and/or software (hereinafter generally referred to as the App control system) that enables processing of data within the wireless mobile device, transmission of data from the device, and control over components and/or functionality, including other applications and programs stored on the device or elsewhere. For example, the App control system is connected through hardware and software to the video or still camera 14 on the mobile device for activating the camera to provide intermittent or continuous video or still photos after the user has started the App. The App control system preferably causes the device to store the video or stills in memory, either flash or fixed memory. Alternatively, or in addition to the local storage on or connected to the device, the App control system can cause the device to transmit the digital video or stills through WIFI, cellular communication or other telecommunication system to a remote storage cite, such an a web-based server, a personal computer, an emergency response center (such as an E911 center, or campus or building security) and/or a security monitoring facility, such as ADT or Brinks Security or individual contacts.

The App control system is also preferably capable of activating the microphone 16 to cause the device 10 to retrieve audio sounds from the microphone upon activation of the App. The retrieval may be continuous or intermittent (such as at predetermined times or when sounds are detected). The digital data representing the audio sounds may be stored locally (in a fixed or removable memory source), and/or transmitted through WIFI, cellular communication or other telecommunications system to a remote storage cite as described above. If the wireless device includes a still camera, the audio data may be transmitted along with the still photos or separate from them. If the wireless device includes a video camera, the audio data may be included as part of the video data, but could also be sent separate from it.

If the wireless device includes a position location system, such as a GPS receiver, the App control system also preferably activates the GPS system to determine the location of the wireless device and stores the data locally and/or remotely as described above through the wireless device's telecommunication system. The position location data may be transmitted intermittently (such as every 30 seconds or when a change in location above a threshold distance is determined) or continuously, thereby providing a data log of the device's changing position so as to track the movement of the phone.

The control system includes programming that preferably determines when to activate one or more of the components, and when and/or how to process the data received from those components.

In one embodiment, the control system includes a notification system that is responsive to activation of the App. When the user presses, clicks or otherwise activates the App (i.e., by touching an icon or shortcut placed on the mobile devices display screen or depressing a hardwired button on the mobile device designated to activate the App), the control system, in one embodiment, immediately sends a message through the telecommunication system (e.g., automatically dials) to one or more preset emergency numbers, such as to E911, campus security, and/or a national security monitoring service like ADT. The message may be a preset audio (or text) message, such as "This is an emergency message from phone 123-456-7890, which is owned by Mary Smith. Help is needed. The phone is transmitting from Latitude 12.345 and Longitude 98.765." Alternately, the GPS system may provide a more specific location which is inserted into the message, such as "Broad and Chestnut Streets, Philadelphia, Pa."

It is also contemplated that the App may be programmed to transmit only certain information (such an audio transmission) to the police at the E911 number and inform the police that additional data, such as video data, digital sound, and/or GPS tracking information, can be obtained at a certain website or through a national or regional security service.

In order to prevent the App from inadvertently being activated, the present invention contemplates that the App control system may be programmed with a delay, thus requiring the user, for example, to either depress the icon for a predetermined time, such as 5 seconds, or to depress the icon twice within a predetermined time (e.g., within 5 seconds). Other ways of protecting against inadvertent use or notification transmission could be used in the App, such as a delay in transmission of the notification to the police thereby giving the user time to enter a deactivation code.

It is also contemplated that the App may be designed to operate in a hidden mode so as to prevent anyone that views the device other than the owner from knowing that the App has been activated. One method of doing so is for the App to maintain the standard operation of the device (e.g., the App is programmed to run in the background and maintain the default screen view.) In order to allow the owner to realize that the App is active, an inconspicuous icon can be displayed on the main device screen, such as an imitation of a device home screen, a certain type of wallpaper to is a secret code to the user that the App is running, or a completely blank screen, or the App icon can be depicted in a different color (e.g., change from red to blue). The telephonic functions of the device may remain operational or may be mimicked so that if someone other than the user checks for a dial tone, a sound will be provided. Also, certain features of the mobile device may be disabled to prevent an individual other than the owner from checking to see if the wireless device is transmitting information. For example, the phone log may not be updated to indicate that a call was made to the police.

In one variation of the invention, the App may not transmit any message to the police or other security service. Instead, the App would activate the device components (video, camera, microphone, position locator, etc.) as described above and store and/or transmit the information to a remote location, such as storage in the clouds (web storage locations), FTP sites, home computer, etc. When the owner or a third party (e.g., police, security company, designated contact, or relative) determines the device (or the owner) is missing, they could access the stored information. The information would provide the person accessing it with information (such as a GPS log of where the device has been transmitting from) that might assist in locating the owner or the device.

In another variation of the invention, the two way telecommunication system is used to activate the App. This embodiment of the invention is particularly useful if the device has been stolen. The owner dials an alternate number or certain e-mail address associated with the device that is associated with the App. Instead of ringing, the device receives the call or e-mail and activates the App. The App then begins operating and transmitting as described above. The owner to other authorized individuals can access the information that is remotely stored as described above to locate the mobile device.

As discussed above, the App preferably includes a notification system that, in its simplest embodiment, is an auto-dialing program that allows for automatic dialing of 911 or other emergency response service number, such as a security monitoring system. The system may broadcast a default message (or user preprogrammed message) to the emergency response service and may send a further message to the emergency response service or a secondary person such as a relative. The message may or may not include the data from the device components. If it does not include the data, the message may direct the emergency response personnel to the location where the data can be found, such as a security company, the user's home computer or a storage location on the internet, e.g., "in the clouds". The message may include a security code to allow the emergency response personnel to access the information. Preferably the data stored at the remote location can only be deleted by the user inputting a predetermined code. Similarly as described herein, the system may include a secondary code that the user enters if he/she is being forced to delete the information against their will, the entry of the secondary code causes the system to mimic deletion of the files but instead notifies monitoring personnel that the user is being forced to delete the data.

In one embodiment of the invention, the App includes the following features and functions. During initial startup, the App starts the GPS tagging functionality which identifies the location of the mobile device at that moment. The App also runs a profiling module to setup information on the user, such as recording the user's voice message or text message (or permitting the user to select a default message from one or more prerecorded messages, and adding contacts (either manually or by pulling data from the mobile device's contacts list.) The App also preferably prompts the user to enter a personal identification number (PIN) which is used by the App to limit access to the profile for future changes and/or to permit the user to terminate the App during an erroneous distress call.

After completion of the profile setup, the App may automatically send a notification email, SMS text, and/or voice message to the user's identified contacts (other than the emergency responders) notifying them that they have been added to the user's emergency contact list and explaining what that means. The App may provide the contact with the ability to reply accepting or rejecting the request. If the contact rejects the offer to be an emergency contact, the user is notified of the contacts decision to not be an emergency contact and the App may prompt the user to add an additional contact if there are no other emergency contacts stored in the user's profile.

If the mobile device does not include video capability (or even if it does), during activation in an emergency, in addition to recording and transmitting GPS coordinates, the mobile device preferably records and transmits audio and/or still image data (if the device includes a still camera) to the emergency contacts, emergency monitoring personnel, or the remote storage location, either by streaming or at periodic intervals (e.g., taken at 10 second intervals) as bulk uploads.

If the mobile device has video capability, such as the Apple® iPhone® 3GS, 4G, or 4GS smartphone, the App uses the video capability to capture and transmit video data in addition to GPS, audio, and may also use the photo functionality of the device.

In the event that the user activates the App to send a distress call, as described above, the App preferably includes the ability of the user to terminate the distress call (for example if the App was activated inadvertently). In this mode, the App provides a time frame, such as the first five (5) seconds after activation, for the user to either type in a cancellation code, or hit a certain key, such as the Home Button on the iPhoneg® smartphone, thereby automatically cancelling the distress call. During the 5 second initial delay, the App preferably still captures the data (GPS, audio, video, pictures) but does not immediately send it until the 5 second period has expired. For example, two GPS readings can be taken in the delay period and the speed and heading calculated prior to transmission. If the App is deactivated using one of the cancellation methods, the data is preferably erased.

After the initial 5 second delay, the App can preferably only be deactivated by the user by entering their PIN or shutting down or disabling the device. If the user enters the proper PIN the App is terminated and the App preferably sends a message to the contacts that the distress call was a false alarm or that the user is okay. If the device has already transmitted data, the data both on the local device on the remote storage device (if one is used) may be deleted. However, it is contemplated that the system may maintain the data on the remote storage device or at a monitoring system for future use, for example, for contacting the user regarding false or improper activation of the App. The App may include an optional function that permits the user to enter a false PIN which appears to deactivate the App, but which in actuality sends a further message that the distress call is not a false alarm. This would be beneficial in cases of abduction where the individual committing the abduction determines that the App is operating and forces the user to terminate it. The App may also prevent the device from being shut off by mimicking a shutdown of the device, including deactivating of the dial tone or speaker, while still transmitting data secretly. Only if the user takes a certain action, such as typing in the correct PIN or pressing the Home key 3 times within 5 seconds, will the system completely shut down.

As discuss previously, the App can also track movement of the device, through analysis of the GPS data, and calculate the heading and speed of the device. That information can also be provided to all emergency responders to give them the ability to estimate the future location of the device, and potentially deduce whether the device (and thus the user) is in a vehicle, walking or stationary. The ability to process data to determine heading and speed is within the knowledge of those skilled in the art. The system can also determine how long the device has been at a particular location. All this information may be transmitted as described above.

During a distress call, the App may be configured, through the user profile setup or depending on the App version, to cause the mobile device to:

vibrate with any Data-transmission (or alternatively shut-off the vibration to hide the transmissions);
distribute emails/SMS/voice messages to some or all designated recipients depending on profile;
call, email, or otherwise transmit to 911 or other emergency responder;
contact a predetermined monitoring center (such as a company like ADT);
capture photos, audio and/or video during preset intervals, and upload or stream the captured information; and/or
capture and transmit/distribute GPS coordinates, including latitude, longitude, speed, and/or heading.

If no internet connection is available at the time that the App is attempting to transmit, the App preferably stores the data on the device and monitors the availability of an Internet connection. Once a connection is found or cell signal is detected, the device uploads the stored data.

In one embodiment, the App operates in the following sequence upon launch:

App captures GPS, shoots video/images and retrieves audio on launch;
5 Second Delay;
App hides itself, returns user to springboard or desktop and dims screen;
App captures GPS again, heading and speed is calculated based on current reading and initial reading;
App begins uploading/streaming captured video/images/audio, preferably with information stored about the user (such as photo, emergency contact information, medical information, etc.);
10 Second delay;
App captures GPS again, heading and speed is calculated based on current reading and last GPS reading; and
App begins uploading/streaming video/images/audio.

It is preferable that the App sends a notification to the designated recipients each time the user's location changes or if accuracy of the location improves. If the GPS location of the user has not changed over a prescribed period, the App sends an email noting the GPS location (and preferably indicating that it has not changed) and may also capture and send images/video from the device. The App could be configured to compare the images and/or video and if there is no change, the App does not transmit the images/video to save battery life. The App could also be configured to analyze the audio signal and it the audio signal data is not above a threshold (representing an audible sound), the App can stop recording or not transmit the data.

Preferably the App is configured to also sent emails to the user's personal account or computer during a distress call. The App also preferably stores the distress call history.

Each distress call email preferably includes:
date & time of activation;
user photo (if stored on the device or in App) and other person information (height, weight, gender);
predetermined message with help request;
link to and/or image of Google® Maps, Yahoo® Maps or other digital map with user's most recent location and may include depictions of past locations since the App was activated;
most recent GPS coordinates, such as street address (as determined from the GPS coordinates if possible), latitude, longitude, altitude, speed, and heading;
links to captured video (if stored on a remote location on or on the internet) or video included with the message; and
links to images and audio (if stored on a remote location on or on the internet) or images and audio included with the message.

Each distress call SMS text message preferably includes:
most recent GPS coordinates, such as street address (as determined from the GPS coordinates if possible), latitude, longitude, altitude, speed, and heading;
URL link to Google® Maps, Yahoo® Maps or other digital map with user's most recent GPS location shown and may include depictions of past locations since the App was activated; and
brief help request message identifying the user.

The App preferably periodically (e.g., yearly) sends an email/SMS/voice messages to the recipients that are identified in the profile (other than emergency responders) to insure contact information is still accurate. The message may be set to give the recipient the ability to remove their name from the emergency contact list. The App can also be configured to periodically run tests and send the user the results of the tests. The App may also periodically notify the user to update his/her information, including medical information, list of contacts, etc.

It is also contemplated that recognition software may be included as part of the App or as part of a separate software system on a remove server that receives the data to try to recognize locations (such as street signs, unique structures or artwork) for purposes of trying to ascertain the location of the user and the device. As the data is stored, the software reviews the image and/or series of images and the location data, and attempts to discern the location. If a location is determined it may be stored or provided as further information (e.g, a message may be included such as "it is believed that the user has entered the campus bookstore on the corner of Waverly and Ridge streets.") In addition to vision recognition software, voice recognition and voice command software can be incorporated to determine if the user is talking. This can be used to prevent someone other than the user from turning off the App once it is activated. It also allows the user to activate the App with a special code word.

The iPhone® 4 smartphone and other recent smartphones have come out with dual video cameras, one on the front and one on the back to permit video chatting. It is contemplated that the App can use the cameras on both the front and rear facing cameras to provide additional information, such as capturing how the user is doing while also capturing the surrounding details, or if the App determines that the data from one camera is not useable, e.g., the device is positioned so that the main camera is facing a surface (such as a tabletop), the App can use the second camera to record data. The App can determine if the camera image is sufficient by analyzing the digital data in any well known manner, such as looking at the brightness of the image, detecting edges, etc.

Another optional feature of the App is the use of fingerprint scanning. There are applications on the market that can scan a user's fingerprint and store the relevant data. In one embodiment, the App uses the fingerprint scanner to store fingerprint information related to the user. The information can be stored during the initial setup. Once the App is activated, the App can only be deactivated when a fingerprint scan is taken and the App determines that there is a match between the scanned data and the stored data for the user's fingerprint. If there is no match, the App continues to operate recording data and sending it.

In a modification of the above embodiment, the App can also, upon receiving a non-matching fingerprint, send the data on that scanned fingerprint to the emergency responders. Thus, in the event the App is running and a criminal picks up the device, the App will determine that it is not the correct user and send the fingerprint to law enforcement who could then run the fingerprint through the national database to find a hit.

It is also contemplated that the App can monitor the keywords or codes used to unlock that App and, if a certain code or keyword is typed in, the App can do something other than turning itself off. For example, the user can program the App to be deactivated upon typing in "Safe", but to send a further emergency notice when the word "All Clear" is typed in. Thus, in the event that the individual that created the emergency situation finds out that the App is running and tells the user to turn it off, the user can type in the words "All Clear" and a further message may be sent to the recipients such as "This is not a test, Please help immediately!"

The following is a non-exhaustive list of potential uses for the App:
  Child or children are walking home from school and a stranger approaches them in a vehicle and offers to give them a ride.
  An individual on a date is being harassed by the other person.
  Suspicious person following the user at night or while in a parking lot.
  A suspicious vehicle approaches or follows the user.
  A domestic violence event where the user is afraid to or can't pick up a phone and call.
  A road rage incident.
  A hit and run accident.
  A serious vehicle or pedestrian accident or injury where the user cannot call or speak into a phone.
  An assault or a threat by someone with a weapon.
  A robbery occurs.
  A circumstance involving abuse of authority by an official.
  Violent or criminal behavior, such as a severe fight, shooting, or stabbing.
  Civil disorder and demonstrations, such as flashmobs.
  Psychological crisis.
  Critical medical condition occurs, such as a stroke, or asthma attack.
  Animal attack.
  Hazardous material accident.
  Weather emergencies, such as severe snow, tornado, hurricane, or earthquake.
  Security alerts.
  Report a serious incident as it is occurring, such as a kidnapping or carjacking.
  Report an aircraft incident while it is happening.
  Activated in the case of a purse snatching and allow to provide tracking as you follow the path of the perpetrator.
  Activated if a police officer is in trouble.
  Activated in the cases someone breaks into your home while you are there, or while a crime is in progress.
  Activated to report a serious fire or explosion, or chemical spill.
  Activated to report a safety risk, such as chemical spills,
  Activated by a security guard, such as armored truck guard, while on duty or in the case of a threat.

It is also contemplated that the system can be used as part of a campus security system for a university or college campus. In this embodiment, the first responders may be the campus security. If a student is in a critical situation, such as a mugging or kidnapping, the student can activate the App. The campus security would receive the messages and/or data as discussed above. In addition to sending security officers to the location sent from the mobile device, a corresponding or separate application on the campus security system can be configured to automatically orient campus video/surveillance cameras to the location to assist anyone in a monitoring station to locate the incident. In the event that the student is abducted by the perpetrator, the GPS tracking information, such as direction of travel, can be used by the campus security to direct campus security personnel or police to a specific location to cut off the perpetrator.

In another embodiment, which can be particularly useful in a campus setting, the App can include a geo-fencing feature. A geo-fence is a virtual perimeter for a real-world geographic area. The App or more preferably the monitoring station includes the virtual boundaries that define the region being monitored. The geo-fence boundaries can be a radius around the center of a campus, house or corporate complex, or can be a predefined set of boundaries that define the physical boundaries of the campus or complex, a floor of a building, a neighborhood, etc.

The system monitors the geo-fenced zone for mobile devices that are transmitting a distress call from any App or an authorized App (i.e., an App that has been previously authorized to be monitored in the geo-fenced zone). When an App is activated so as to indicate an emergency or a request for monitoring exists, a signal is transmitted to the monitoring station and is picked up by the monitoring software and displayed to the monitoring personnel. The location of the signal may be depicted on a satellite or generated image of the geo-fenced zone. If it is a school campus or company complex that has its students' or personnel's mobile device information stored, information associated with the mobile device owner, such as the name and picture of the student or employee, health records (medications that they take), class schedule, etc., can also be depicted on the monitoring station display.

The personnel at the monitoring location can then contact campus or local security, or dispatch emergency responders, such as ambulatory assistance, to the location. The display might also identify the locations of local cameras and provide the monitoring personnel with the ability to quickly bring up the real-time (or stored) views from the local cameras.

It is contemplated that the App could use the geo-fencing feature to direct messages to users in the geo-fenced zone. That is, automatic alerts can be sent based on the defined coordinates of a geographic area. For example, an email or text alert message associated with an event in the geo-fenced zone may be automatically sent to a user's mobile device (that is running the App) when the user enters the geo-fenced zone alerting them to something relevant, such as a damage in the zone, a stranger seen lurking, construction at a certain location, an event coming up, etc. It is contemplated that the system may be used such that when a user enters a geo-fenced zone, the user might receive broadcasted or directed messages, such as crime maps for the area and tips. The App may be used to send an e-mail or text message to a third party, such as a parent, when the parent's child arrives home from school. In this last example, the geo-fence would be a geographic virtual boundary surrounding the house. When the child's cell phone (with the active App) is detected entering this area, an e-mail or text is automatically sent to the child's parent by the App.

It is envisioned that geo-fence can be established around a neighborhood and have alerts sent out to the neighbors in the geo-fenced zone by the local government regarding something affecting their particular neighborhood, such as a lost animal, stranger alert, etc. Thus, the App has the capability of sending broadcast alerts from a central location to a specified zone.

The system may be used to broadcast an alert to others in the geo-fenced zone when an alert has been received. For example, in the event that a mugging is occurring in a geo-fenced zone, a broadcast can be sent to cellphones running the App in the geo-fenced zone to keep away from a certain location.

In one embodiment of the invention, the App can be connected to specific monitoring personnel through the use of a particular code. More particularly, a geo-fenced zone (e.g., a campus or corporate facility), a general location (e.g., a state park or concert), or a special group (e.g., travelers on a tour or a political entourage) are provided with a specific code that associates the App with specific monitoring personnel for providing an emergency response if needed. During set-up or at any time by updating the profile, the user enters the unique code into the App. The App then automatically associates the mobile device with specific monitoring personnel. As such, when the App is activated in an emergency situation, in addition to sending messages as described herein to contacts that the user lists in the profile, the App also notifies the specific monitoring personnel assigned to the number. For example, members of a tour can be given a code that is associated with the tour guide's phone. Thus, if a member of the tour is in trouble and activates the App, the tour guide is automatically notified and the data as described herein (GPS information, SMS text, etc.) is provided.

As should be apparent from above, the App can also be used as an electronic escort permitting a concerned user (or parent) to monitor the user while they are traveling. For example, if a user is walking between two locations, they can select the escort or Safe Walk service and enter in the time it should take to get to the destination. One activated, the system tracks the user, the time, and can record all the information discussed above. If the user does not get to the destination in the allotted time, the system can send them a text asking if they have gotten their safely. If there is no response, the system goes into its tracking mode and, if it is already not doing so, begins to track location, video, audio and still images. It is contemplated that the user need not have to enter in the time, but can instead enter in the destination. The system will determine the route and time it should take. The system would also include an easy touch screen icon to turn the escorting service into a true incident notification.

It is also contemplated that if a user feels he or she is being followed or is worried about walking across campus alone late at night, they can activate the App and inform the monitoring personnel that they want to be tracked as they cross the campus. The monitoring personnel can then monitor the phone movement, and text or talk with the user until they reach their location on campus.

In another embodiment of the invention, the App can also be activated externally for providing information. In this embodiment, the App is responsive to a remote transmission, such as an email, phone call, wireless activation, etc. and could be set up to not include sending a transmission to an emergency responder such as 911. Instead, the remote transmission can be used to activate the App for purposes of tracking the mobile device and receiving video, still photos, and audio information. This can be particularly useful in several cases. If a parent wishes to track and monitor where their child is and what they are doing, they can activate the App stored on their child's mobile phone remotely and retrieve the information. It is similar to a Lojack® system, although it provides more detailed data and permits the parental monitoring of conversations. The App can also be programmed to retrieve the call history from the phone and other data including text messages. In the event that the App is when a call or text comes in or is being sent, the App may go into background mode so as to permit the sending or receiving of the call or text. It may continue to store information, such as location information. The App will then reactivate when it detect that the call or test is complete. This allows the App to remain hidden during use.

This version of the App is also helpful in the event that the mobile device is stolen from someone during a robbery. The App can be activated and the data transmitted to law enforcement for purposes of tracking the perpetrator.

The monitoring personnel preferably have access to additional information on the users that they are monitoring. For example, the system preferably includes information that each user entered into the App profile, including a recent photo of the user, the user's emergency contacts that are receiving the emergency notices, medical information including any prescription drugs the user is taking, information from third parties, such as school records, class schedule, reports about the user, and a history of activations of the App. Due to the personal nature of such information, preferably some or all of this information is encrypted until the user activates the App. At that point the system decrypts the information so the monitoring personnel have access to it. There may also be a missing persons' section with listing of people that are missing.

The monitoring system might also include a tips section where users can anonymously or openly submit tips on crimes, campus violations, or breaches of company policy. Information on criminals (including their record), and suspicious individuals can also be displayed to all monitoring personnel to have the information available in one location. In the event that the system is used in conjunction with a geo-fenced zone, it is contemplated information related to certain individuals in the geo-fenced community can be listed, such as known criminals.

In order to reduce the occurrence of false reports, the present invention contemplates that a credibility rating can be developed for each user. The credibility rating could be based on the number of uses of the App over a period of time, including which activations where determined to be legitimate can be displayed to the monitoring personnel so that they can consider the source of the alert.

The system could also be used to inform monitoring personnel of suspicious activity. For example, if a user sees a suspicious package lying unattended in a facility, they could activate the App and report the package, including taking a picture or video of it. If the user is in a geo-fenced zone, the monitoring personnel can view the package and determine whether emergency personnel need to be contacted and direct them exactly where to go. This also applies to crimes that a user sees in action. If the user wishes to remain anonymous, they can potentially activate an icon on the display which then sends the transmission without the user's information.

As discussed above, the present invention has applicability beyond actual emergency situations and can be used with neighborhood watch groups, mall security, and corporate administrators to monitor events in their location.

For overseas travelers, the system may include embassy phone numbers and e-mail addresses. As such, when a user is in trouble in a foreign country, they can activate the App or a function of the App which immediately sends a message to their embassy that they are in trouble or need of assistance.

The present invention can also be used at special events, such as concerts, where a security group needs to keep track of security personnel and attendees of the event. For example, the event organizer can have attendees download and install the App and enter a specific monitoring station code (preferably associated with a geo-fenced zone). The App, when activated, would then notify the security monitoring personnel if there is an incident. The system would allow the security monitoring personnel to track locations of the security force running the App and to dispatch them quickly to areas where there are issues developing.

The systems described above may be configured as a computing application, a computing applet, a computing program and/or other instruction set operative on a computing system to perform the functions, operations, and/or procedures described above. An exemplary computing system is controlled in a known way primarily by computer readable instructions, which may be in the form of software, for performing the various steps, processes, and functions described above. The computer readable instructions can contain instructions for the computing system for storing and accessing the computer readable instructions themselves. Such software may be executed within one or more processing units, such as a mobile device's microprocessor, to cause the computing system to do work.

As described previously, the various techniques described herein may be implemented in hardware or software, or a combination of both. Preferably, the techniques are implemented in computing environments using programmable computers that include a processor, a storage medium readable by the processor (including volatile and non-volatile memory and/or storage elements), at least one input device, and at least one output device. The App is preferably stored on a storage medium on or attached to the device and is readable by a general or special purpose mobile smart phone for configuring and operating the mobile device when the storage medium is read by the microprocessor to perform the procedures described above. The A computer-readable storage medium, such as a flashdrive, CD-ROM, hard drive on a server (such as those associated with the iTunes® App store), etc, may be programmed to store the App, such that the App can be operated from the storage medium, or downloaded, retrieved, streamed or otherwise transferred from the storage media to the mobile device.

In another aspect of the invention, a secondary application (Second App) may be operating on the devices or systems associated with the emergency contacts, including the first responders, or may be stored at a remote location for activation by any of the recipients. The Second App may be programmed to permit the recipient, such as the emergency responders or a monitoring service to transmit the data immediately to select secondary recipients selected by the user or the recipients so that they can use the information to assist in the helping the user and/or may store the information for access by such recipients. For example, upon the user activating the App, the data associated with the mobile device (GPS data, video, audio, etc.) is transmitted to an emergency responder and/or a monitoring system and emergency contacts. If the Second App is activated by any of the recipients (such as the 911 operator), it permits selection of additional responders to receive the transmitted data, such as police officers on patrol in the vicinity of the incident. As such, as the 911 operator receives updated information (such as changing positional data), the secondary responder also receives the information, thus eliminating the need for the operator to relay the information. The Second App can be programmed to automatically select secondary recipients when activated based on pre-selections entered by the responder or user (such as family members to contact in the case of emergency).

Figure 2:
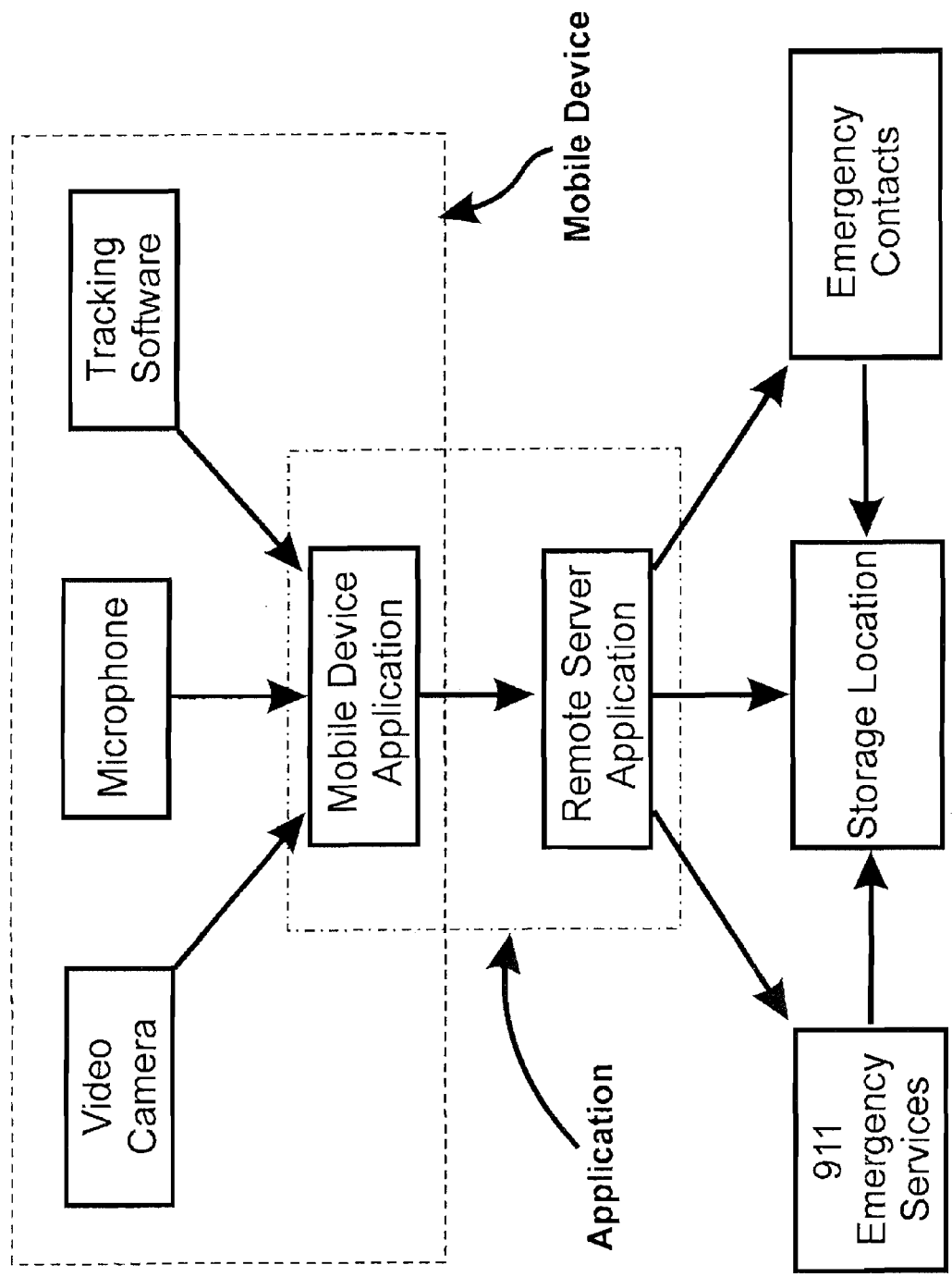
FIG. 2 schematically depicts another embodiment of the present invention.
Figure 3:
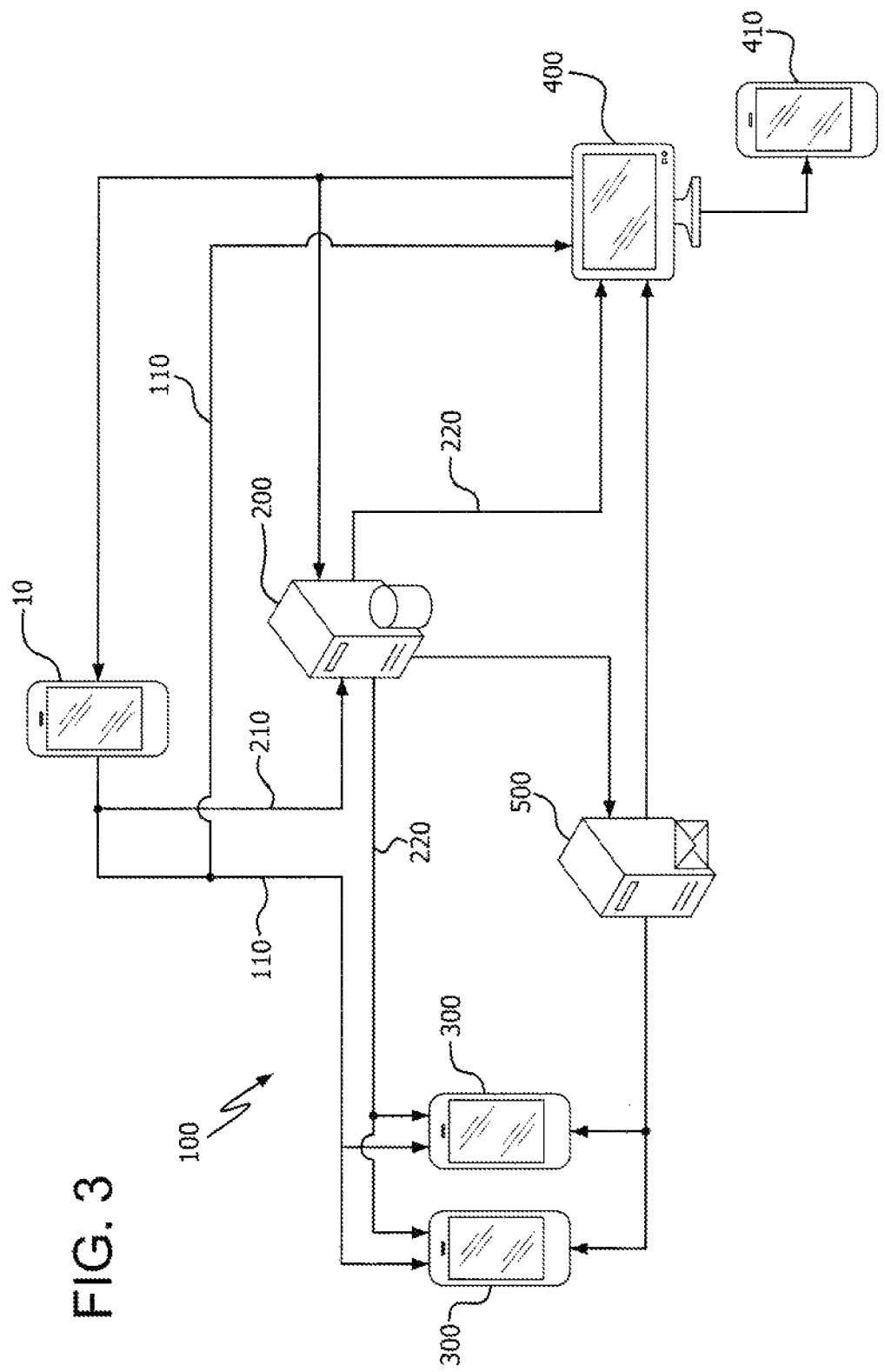
FIG. 3 schematically depicts a system according to the present invention for transmitting emergency communications using the App.

While the present invention has been described as an application for running on a mobile device, it is also contemplated that some of the functions and actions described could be configured to occur on a separate server. As shown in FIG. 2, it is contemplated that a remote server may be part of the system such that when the App is activated on the mobile device, it communicates with the server, which then commences some of the functions described above. For example, referring to FIG. 3, an embodiment of the system 100 is illustrated where the App on the user's device 10 may direct some data to be sent along lines 110 directly to the emergency contacts 300 and emergency responders 400. Other data (e.g., GPS location coordinates, audio data, video data, etc.) may be sent along line 210 to a remote server 200. The remote server stores the information. In addition, the server may also include a list of the emergency contacts 110. After the data is received by the server, it may perform some of the functions described above, such as determining heading, generating a map, etc. and sends or makes available the additional data along line 220 to the emergency contacts 110 and the emergency responders and/or monitoring personnel 400/410. This allows the mobile device to save critical battery life since some activities, such as calculating speed and direction, sending multiple messages, etc, can be conducted on the server 200. The server 200 can also store records of all the information transmitted by the mobile device, as well as all the notifications that the server 200 sends to emergency responders and emergency contacts. The information can be stored on the server 200 or other a remote storage device. It is possible to include a security system on the server, such as password protection limiting access to the stored data. When the email is initially sent from the mobile device 10, it may include a link (e.g., internet address) to the server location where the data is stored and a password or simply just transmit a secured link to the recipient. Thus, the recipients may also be able to access the server 200 directly. Also, as shown, an additional server 500 may be used to handle sending e-mails and texts.

Thus, in this embodiment, the system or application may include sub-applications, modules, or subroutines that are stored on devices other than the mobile device.

It is also contemplated to facilitate the display of the mobile device on a map, the data retrieved can be used to augment and enhance the map it is depicted on. For example, it may be possible to identify on the map data of interest, such as sections of the user's captured historical GPS trail where the movement slowed down or changed (e.g. backtracked), or overlay data from other sources, such as building or floor plans/data from a university file, to provide a more real depiction of the surrounding area.

Although the embodiments described above have described the sending of the position, audio and video data by e-mail and/or SMS text, it is also contemplated that the system could transmit a prerecorded voice message with the GPS coordinates digitally appended to the message. Also, it should be apparent that the sending of a message or data to a recipient (e.g., contact, emergency responder, server, monitoring personnel, etc.) as described in the present application means transmitting the message or data through a telecommunication system, such as through a WIFI, cellular or similar transmission, to an address associated with the recipient, such as telephone number, e-mail address, text address, Twitter® social networking account, web address, data storage location, or other location which can receive an electronic transmission. Further, the GPS coordinates, texts, e-mails, digital images (video and still) and audio messages described herein are transmitted as data, and may be in streams, packets, bulk uploads, or any other convention method for transmitting such data. It should be readily apparent that the use of the phrase emergency responder herein is not limited to police, fire and/or EMS personnel, but is broadly defined as including monitoring services and personnel, security personnel, monitoring or surveillance systems or individuals that are intended by the user or system to be an initial recipient of alerts/notifications.

Also, as described herein the sending of messages, e-mails, and other data to recipients can be directly to the recipients or through use of intermediate devices, such as servers associated with the system. For example, instead of the mobile device using an SMTP service to create and transmit e-mails, the App can take advantage of cloud based systems, such as Arnazon.com's® mail service, to dynamically build and distribute e-mails from a server hosted by the monitoring service or the first responders. Similarly, the texts that are sent by the App can use a cloud based server to transmit the short SMS code texts. So the App communicates with a remote server that initiates the texts to the contacts.

Referring to FIG. 4, in one embodiment 600 for use with the various App and mobile device configurations described above, there is an intermediate server station 700 that may include multiple servers for receiving and controlling the texts and e-mail transmissions, and storing the additional data, including historical geotracking data and incident data (time, location) and media data (video, audio, pictures, etc.) The incident data and media data may be stored on separate servers. Additionally a webpage may be provided to facilitate a contact 300 or emergency responder 400, 410 retrieving information related to an incident. The intermediate server station 700 may also include the geofencing data and access information for controlling a monitoring station's 400 access and/or use of the overall system (i.e., providing the geographic limits and/or access limits). In the illustrated embodiment, the App on the mobile device 10 is configured to, upon activation, transmit one or more of the messages described above to the intermediate server station 700. The server station 700 controls the transmission of texts and emails to the contacts 300 and the monitoring station/emergency responder 400. The media data can be stored at the intermediate server station 700, and links to the data provided in the texts and/or emails sent to the contacts 300 and/or monitoring station/emergency responder 400. This simplifies the operation of the App on the mobile device, thus reducing the mobile device usage so as to extend the battery life. The contacts 300 are preferably stored at the intermediate server station 700 as part of the user's profile data. Thus, a signal sent from the App to the software system on the intermediate server station 700 will cause the e-mails and texts to be sent to the contacts 300 and/or the emergency responder 400.

In another embodiment, the App on the mobile device can be used to activate one or more remote cameras for purposes of capturing visual or audio data. For example, the user may have a small portable device, such as an MP3 player, that contains a camera and/or microphone, and is WIFI, Bluetooth®, 3G or 4G wireless technology enabled and is clipped or otherwise attached to their outfit. the App can be configured such that, upon activation, the mobile device searches for the remote camera/microphone and uses that camera/microphone to capture surrounding visual/audio data and send it to the mobile device, which can then store the information or transmit is as described above. This allows the mobile device to remain hidden and, thus, not alert the perpetrator that the events surrounding the user are being recorded. In one embodiment, the remove cameras can be mounted in a car and, in the event that a user determines that their car has been stolen, they can activate the camera which would then begin taking still images, video and/or audio of the inside of the car and relay it to the user or a remote storage location, along with GPS information if possible.

In addition to mobile phones, this embodiment of the invention can be used with other mobile or portable devices, such as an iPad® tablet or laptop, or can be used with a desktop device such as a PC or iMac® computer. This embodiment of the present invention has applicability in home security systems where portable devices can be mounted at various locations throughout the house and wirelessly connected to the base computer. The base computer can retrieve information from the various wireless devices and store it on the computer or transmit it to a remote server, as described above.

All data is preferably encrypted prior to sending to provide increased protection.

The present invention may be embodied in other specific forms without departing from the spirit or essential attributes and, accordingly, reference should be made to the appended claims, rather than to the foregoing specification, as indicating the scope of the invention.

The invention claimed is:

1. A server for tracking and providing emergency notifications for a plurality of mobile devices, the server comprising a processor and a non-transitory computer readable storage medium having computer executable instructions stored thereon, the computer-executable instructions defining a server application executable by the processor of the server, the computer-executable instructions, when executed by the processor of the server, causing the server to perform steps comprising:

defining virtual boundaries of a geographic area to be monitored;

receiving a communication from one of said plurality of mobile devices indicating a user of that mobile device is involved in an emergency situation, the communication including GPS coordinates indicating a geographic location of the mobile device;

determining from the GPS coordinates and the defined boundaries of the geographic area to be monitored that the mobile device from which the communication was received is located in that geographic area;

displaying the location of the mobile device on an image of the geographic area being monitored, based on the received GPS coordinates, and wherein the computer-executable instructions further cause the server to:

receive a communication from another mobile device of a second user indicating that the second user plans to travel from a present location to a second location, the communication including an indication of the second location and an indication of the amount of time it should take to get to the second location;

track the position of the user based on GPS data periodically received from the mobile device; and send a text message to the mobile device if it is determined from the GPS data that the mobile device has not reached the second location within the indicated amount of time.

2. The server recited in claim 1, wherein the computer-executable instructions further cause the server to associate a unique code with specific monitoring personnel who are to be notified in the event of an emergency within the defined boundaries of the geographic area.

3. The server recited in claim 2, wherein the communication received from the mobile device includes the unique code associated with the specific monitoring personnel, and wherein the computer-executable instructions further cause the server to, in response to receiving the communication from the mobile device:

extract the unique code from the communication;

determine the specific monitoring personnel associated with the unique code; and notify the determined specific monitoring personnel of the emergency situation indicated by the received communication.

4. The server recited in claim 1, wherein the server stores in a memory of the server, for each of the plurality of users, a profile containing information about the user, and wherein the computer-executable instructions further cause the server to, in response to receiving the communication from the mobile device, retrieve the profile stored for the user of that mobile device and display information contained in the profile, wherein the displayed information comprises one or more of the name, a picture, health records, and class schedule of the user.

5. A server for tracking and providing emergency notifications for a plurality of mobile devices, the server comprising a processor and a non-transitory computer readable storage medium having computer executable instructions stored thereon, the computer-executable instructions defining a server application executable by the processor of the server, the computer-executable instructions, when executed by the processor of the server, causing the server to perform steps comprising:

defining virtual boundaries of a geographic area to be monitored;

receiving a communication from one of said plurality of mobile devices indicating a user of that mobile device is involved in an emergency situation, the communication including GPS coordinates indicating a geographic location of the mobile device;

determining from the GPS coordinates and the defined boundaries of the geographic area to be monitored that the mobile device from which the communication was received is located in that geographic area;

displaying the location of the mobile device on an image of the geographic area being monitored, based on the received GPS coordinates, and wherein the computer-executable instructions further cause the server to display the locations of local cameras within the defined boundaries of the geographic area that are within the vicinity of the GPS coordinates received in the communication from the mobile device.

6. The server recited in claim 1, wherein the computer executable instructions further cause the server to, in response to receiving the communication from the mobile device, automatically send a communication to other mobile devices within the defined boundaries of the geographic area indicating that an emergency situation is occurring and providing instructions to keep away from the location of the mobile device from which the communication was received.

7. The server recited in claim 1, wherein the computer-executable instructions further cause the server to broadcast alerts to all of the plurality of mobile devices within the defined boundaries of the geographic area.

8. The server recited in claim 1, wherein the computer-executable instructions further cause the server to:

receive successive communications from the mobile device over time with updated GPS coordinates in each communication;

calculate from the received GPS coordinates a heading and speed of the mobile device; and report the heading and speed of the mobile device to an emergency responder.

9. A server for tracking and providing emergency notifications for a plurality of mobile devices, the server comprising a processor and a non-transito com uter readable storage medium having computer executable instructions stored thereon, the computer-executable instructions defining a server application executable by the processor of the server, the computer-executable instructions, when executed by the processor of the server, causing the server to perform steps comprising:

defining virtual boundaries of a geographic area to be monitored;

receiving a communication from one of said plurality of mobile devices indicating a user of that mobile device is involved in an emergency situation, the communication including GPS coordinates indicating a geographic location of the mobile device;

determining from the GPS coordinates and the defined boundaries of the geographic area to be monitored that the mobile device from which the communication was received is located in that geographic area;

displaying the location of the mobile device on an image of the geographic area being monitored, based on the received GPS coordinates, and wherein the computer-executable instructions further cause the server to:

receive a communication from another mobile device of a second user indicating that the second user plans to travel from a present location to a second location, the communication including an indication of the present location of the mobile device and the second location;

determining an amount of time it should take to travel from the present location to the second location;

track the position of the user based on GPS data periodically received from the mobile device; and send a text message to the mobile device if it is determined from the GPS data that the mobile device has not reached the second location within the determined amount of time.

10. The server recited in claim 1, wherein the defined virtual boundaries of the geographic area comprise a set of boundaries that define the physical boundaries of the geographic area.

11. The server recited in claim 1, wherein the defined virtual boundaries of the geographic area comprise a defined radius around a central location within the geographic area.

12. The server recited in claim 5, wherein the communication received from the mobile device includes a unique code associated with specific monitoring personnel, and wherein the computer-executable instructions further cause the server to, in response to receiving the communication from the mobile device:

extract the unique code from the communication;

determine the specific monitoring personnel associated with the unique code; and notify the determined specific monitoring personnel of the emergency situation indicated by the received communication.

13. The server recited in claim 5, wherein the computer executable instructions further cause the server to, in response to receiving the communication from the mobile device, automatically send a communication to other mobile devices within the defined boundaries of the geographic area indicating that an emergency situation is occurring and providing instructions to keep away from the location of the mobile device from which the communication was received.

14. The server recited in claim 5, wherein the computer-executable instructions further cause the server to:

receive successive communications from the mobile device over time with updated GPS coordinates in each communication;

calculate from the received GPS coordinates a heading and speed of the mobile device; and report the heading and speed of the mobile device to an emergency responder.

15. The server recited in claim 5, wherein the defined virtual boundaries of the geographic area comprise one of (a) a set of boundaries that define the physical boundaries of the geographic area, or (b) a defined radius around a central location within the geographic area.

16. The server recited in claim 5, wherein the computer-executable instructions further cause the server to broadcast alerts to all of the plurality of mobile devices within the defined boundaries of the geographic area.

17. The server recited in claim 9, wherein the communication received from the mobile device includes a unique code associated with specific monitoring personnel, and wherein the computer-executable instructions further cause the server to, in response to receiving the communication from the mobile device:

extract the unique code from the communication;

determine the specific monitoring personnel associated with the unique code; and notify the determined specific monitoring personnel of the emergency situation indicated by the received communication.

18. The server recited in claim 9, wherein the computer executable instructions further cause the server to, in response to receiving the communication from the mobile device, automatically send a communication to other mobile devices within the defined boundaries of the geographic area indicating that an emergency situation is occurring and providing instructions to keep away from the location of the mobile device from which the communication was received.

19. The server recited in claim 9, wherein the computer-executable instructions further cause the server to:

receive successive communications from the mobile device over time with updated GPS coordinates in each communication;

calculate from the received GPS coordinates a heading and speed of the mobile device; and report the heading and speed of the mobile device to an emergency responder.

20. The server recited in claim 9, wherein the defined virtual boundaries of the geographic area comprise one of (a) a set of boundaries that define the physical boundaries of the geographic area, or (b) a defined radius around a central location within the geographic area.

* * * * *